United States Patent [19]
Goldstein

[11] 4,318,393
[45] Mar. 9, 1982

[54] POROUS SURFACE SOLAR ENERGY RECEIVER

[75] Inventor: Richard J. Goldstein, Golden Valley, Minn.

[73] Assignee: The Regents of the University of Minnesota, Minneapolis, Minn.

[21] Appl. No.: 910,609

[22] Filed: May 30, 1978

Related U.S. Application Data

[63] Continuation of Ser. No. 747,890, Dec. 6, 1976, abandoned.

[51] Int. Cl.$^3$ ................................................ F24J 3/02
[52] U.S. Cl. ..................................... 126/438; 126/451
[58] Field of Search ............... 126/270, 271, 400, 438, 126/451; 237/1 A; 60/641

[56] References Cited

U.S. PATENT DOCUMENTS

| | | | |
|---|---|---|---|
| 412,724 | 10/1889 | Calver | 126/270 |
| 1,583,255 | 5/1926 | Moore | 126/271 |
| 1,661,473 | 3/1928 | Goddard et al. | 126/271 |
| 2,998,005 | 8/1961 | Johnston | 126/270 |
| 3,203,167 | 8/1965 | Green, Jr. | 126/270 |
| 3,295,591 | 1/1967 | Thomason | 126/400 |
| 3,369,541 | 2/1968 | Thomason | 126/400 |
| 3,412,728 | 11/1968 | Thomason | 126/270 |
| 3,908,632 | 9/1975 | Poulsen | 126/271 |
| 3,924,604 | 12/1975 | Anderson | 126/438 |
| 4,006,856 | 2/1977 | Nilsson | 126/270 |

FOREIGN PATENT DOCUMENTS 373811 4/1923 Fed. Rep. of Germany ...... 126/438

*Primary Examiner*—Henry C. Yuen
*Attorney, Agent, or Firm*—Burd, Bartz & Gutenkauf

[57] ABSTRACT

A porous surface receiver and concentrator of reflected solar radiation. The receiver is part of a moderately or strongly concentrating solar collector such as a solar power tower system. In the latter, radiation is reflected by a plurality of heliostats disposed about the tower on which the receiver is mounted. The solar radiation is reflected onto the central heat transfer receiver where the energy is transferred to a working fluid. Atmospheric air is used as the working fluid. The air is drawn through the porous matrix of the receiver surface and is heated to a high temperature in the range of 500° to 1500° C. with only a moderate pressure drop. The radiant heat flux input may be hundreds of times the incoming solar flux to the earth surface. The hot air can be used in a thermal storage system, or directly in a heat exchanger, or the like.

6 Claims, 4 Drawing Figures

POROUS SURFACE SOLAR ENERGY RECEIVER

This is a continuation, of application Ser. No. 747,890 filed Dec. 6, 1976, now abandoned.

This invention relates to a porous surface concentrating receiver of reflected solar radiation adapted to transfer the solar energy to atmospheric air as a working fluid. The receiver is intended for use in a moderately or strongly concentrating solar collector system, such as a solar power tower system.

BACKGROUND OF THE INVENTION

Thermal receivers of concentrating solar energy collectors receive and concentrate radiation from the sun so that the energy flux incident on the receiver may be hundreds of times the solar flux incident on the ground. It is necessary that the receiver be capable of accepting the resulting large heat flux and efficiently transfer it to a working fluid. That working fluid can then be used directly in a heat engine, or as a source of process heat, or it may go to a thermal storage system for future use.

THE PRIOR ART

One form of solar power tower system is disclosed by Hildebrandt et al in *Mechanical Engineering*, page 23, September 1974. This is representative of prior designs of thermal receivers in solar energy systems with large concentration ratios of thermal radiation flux which have primarily consisted of liquid receivers. In these, energy is absorbed at the external solid surface of the receiver which may consist of a large number of flow tubes, either within a cavity or directly exposed to the surrounding air. Conduction through the solid walls causes a significant temperature drop. Often large thermal stresses are present. In many of the systems, water is boiled in the tubes. In others, liquid metals are used to promote better heat transfer and lower temperature differences. Few, if any, have proposed direct use of gas working fluid, even high pressure gas, because of the relatively poor heat transfer performance of a gas when the heat must pass through a solid wall to the gas. High pressure systems and uses of such fluids as liquid metals introduce severe safety requirements. Also, such fluids are not as convenient for thermal storage if a pebble bed system (e.g., large volume of solid pellets) is used as the storage medium.

Permeable surfaces have been used in some non-concentrating solar collectors such as those disclosed by Selcuk in *Solar Energy*, 13, 165 (1971); Hamid et al, ASME J. Power, 93, 221 (1971); Swartman et al, *Solar Energy*, 10, 106 (1966); and Lalude et al, Paper No. 7/63, 1970 International Solar Energy Society Conference, Melbourne, Australia. The purpose of the permeable surfaces in those collectors is not to seek and obtain high heat fluxes and high temperature. Accordingly, the design and concept of such systems is far from that of the high temperature solar concentrating collector according to the present invention.

Johnston U.S. Pat. No. 2,998,005 shows a solar heater in which atmospheric air flows transversely through a porous fibrous mat made up of heat absorptive fibers such that the air is heated as it passes through the mat. Johnston contemplates the use of low temperature materials such as black colored glass wool, or the like. Although there may be some incidental reflection of solar radiation from the edges of the hood surrounding the collector panel, essentially no concentration occurs and the system could not be used at high temperature.

Thomason U.S. Pat. No. 3,412,728 shows a solar heating system in which fresh atmospheric air is drawn into the system through openings, which may be holes, slits, or cracks in a transparent cover overlying a heat absorbent surface. Although the air is drawn transversely through a porous sheet, it does not appear that it would be heated to any significant extent as a result of its passage through that material. It is a low temperature system with no absorption and no large heat transfer surface to supply a large amount of heat to the inflowing air.

Johnston U.S. Pat. No. 3,875,925 shows a solar system in which air is recirculated in a flow path through a porous fibrous mat and heated in the course of its passage. The porous mat is formed from low temperature material such as fibrous synthetic resin, fiber glass, and the like. The heater includes a glass cover which precludes the use of atmospheric air and is not feasible for high temperature operation.

Other patents show solar collectors having porous sheet-like material as part of the structure. In each instance, the porous layer is formed of a low temperature material. Even though the material may be darkened to increase absorption of solar radiation, low temperature operation is contemplated. In each instance, the porous layer underlies a non-pervious transparent cover sheet such as glass and in most instances the fluid to be treated is not atmospheric air.

SUMMARY OF THE INVENTION

The present invention is directed to a moderate or high temperature solar concentrating porous wall collector or receiver for use in a solar energy system. A high radiant energy flux is incident on a porous wall surface. Atmospheric air from the surroundings is drawn through the porous wall and heated in the course of its passage. The solar energy is reflected from heliostats and the concentrated solar radiation is absorbed on the outer surface of the wall and on the surfaces within the pores. Heat is conducted through the wall. The air passing through the porous wall is heated efficiently and inexpensively by the large contact surface within the pores as well as on the outer and inner surfaces of the wall.

THE DRAWINGS

The invention is illustrated in the accompanying drawings in which corresponding parts are identified by the same numerals and in which.

DESCRIPTION OF THE PREFERRED EMBODIMENT

Figure 1:
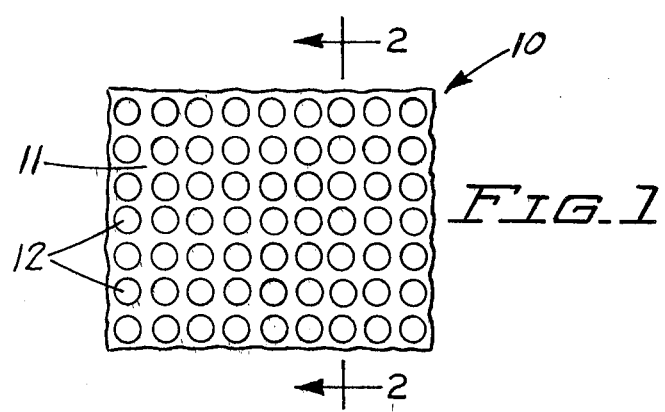
FIG. 1 is a fragmentary plan view of a portion of one form of porous wall solar receiver according to the present invention.
Figure 2:
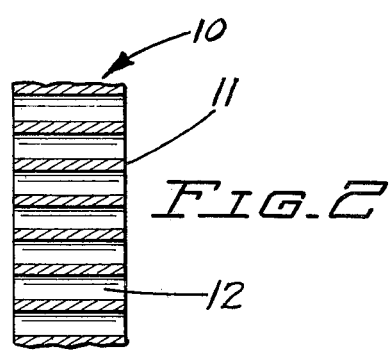
FIG. 2 is a fragmentary section on the line 2—2 of FIG. 1 and in the direction of the arrows.

Referring now to the drawings, and particularly to FIGS. 1 and 2, there is shown a fragment of one form of a porous surface solar energy receiver 10 of simple and effective geometry in the form of a sheet 11 having cylindrical holes 12 serving as pores passing through the wall. The porosity and thickness of the wall are controlled to optimize solar concentration ratio, temperature of heated air, pressure drop, and pump work. The wall may be metallic or non-metallic. It may be formed from solid sheet material in which pores are formed by molding or drilling, or it may be formed with natural porosities, as by sintering of particles of refractory materials. It may be formed flat, or preferably with a curved surface, as in the form of tubes, semi-spherical bowls and the like.

Exemplary high temperature materials which may be used include stainless steels, chromium, tantalum, tungsten, molybdenum, cobalt, nickel, titanium, vanadium, beryllium, zirconium, and the like, and their alloys; ceric and other rare earth oxides, hafnium oxide, uranium oxide, strontium oxide, zirconia, alumina, thoria, lime (calcium oxide), beryllium oxide, refractory nitrides, and the like.

Proper size and spacing or distribution of the porosities permit large flux densities without damaging the surface as well as effective heating of the air passing through the wall. In addition, the pressure drop and pump work for the air flowing through the surface can be made small. Porosities may range between about 10 and 90 percent of the total surface. The pore dimensions, if cylindrical, may have effective hydraulic diameters of from the order of about 0.05 mm up to about 5 mm. The wall thickness may range between about 1 mm up to about 2 cm, dependent in part of the material from which the porous wall is formed. The porous wall should be capable of withstanding temperatures between about 500° to at least 1500° C. Solar concentration producing radiant fluxes up to 1000 times the solar constant (about 1400 W/m$^2$) and even higher are possible.

As one example, with a pore size of about 0.3 mm and a porosity of 50 percent, a wall thickness of a few mm permits heat removal of heat flux of about 1000 KW/m$^2$ in velocities of about 7 m/s with an air and wall temperature of about 1000° C.

Figure 3:
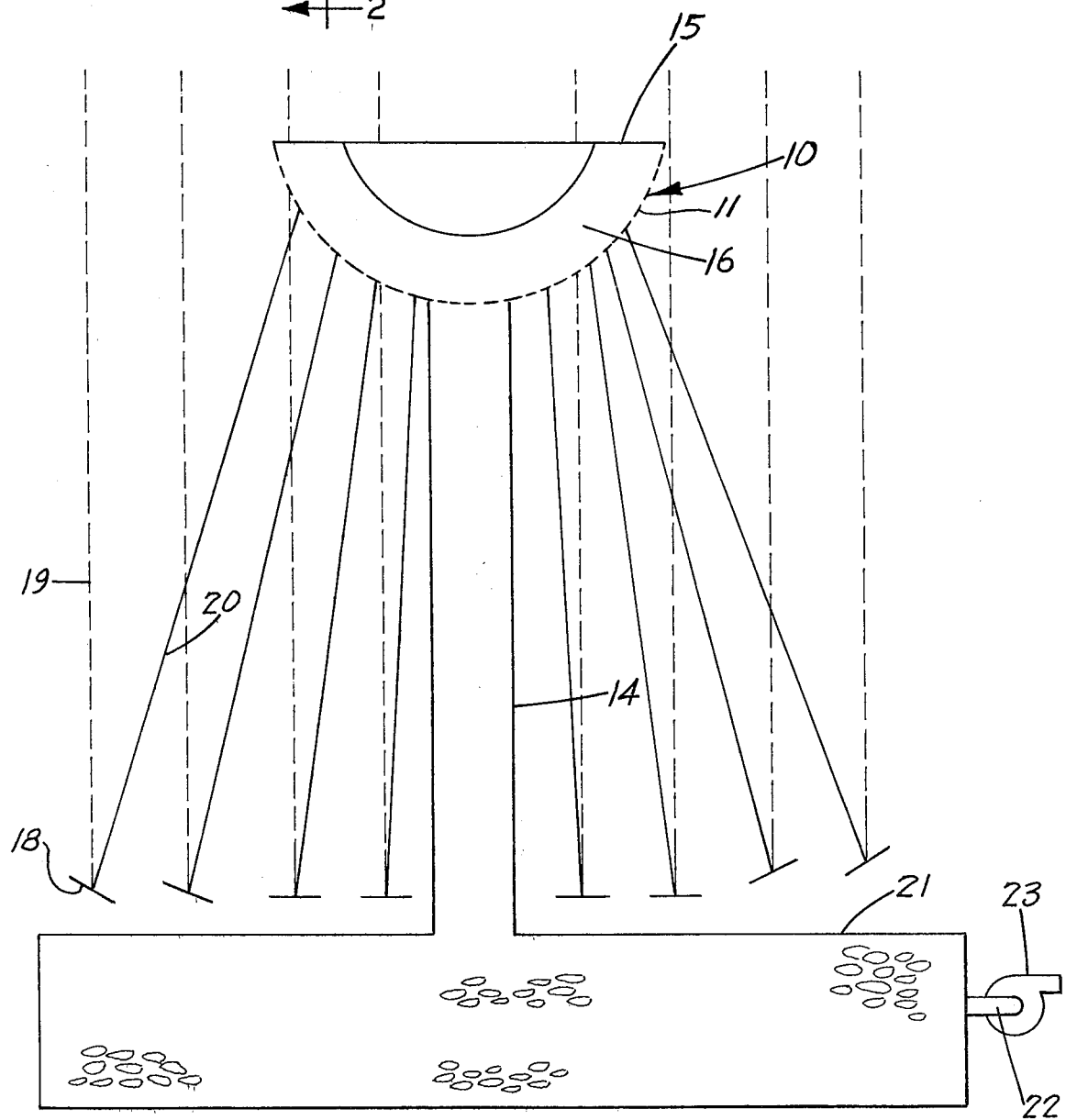
FIG. 3 is a schematic representation of one form of solar power tower system utilizing the receiver according to the present invention.

Referring now to FIG. 3, there is shown one form of solar power tower system utilizing the high temperature porous surface receiver 10 according to the present invention. The receiver surface 11 is convex in form and mounted on a vertical tower 14, preferably in the form of a tubular conduit. The porous wall 11 comprises one wall of a housing 15 enclosing an air chamber 16. Chamber 16 is in direct fluid communication with the conduit of tower 14 through an opening in the porous wall. The porous wall is disposed with its convex surfaces directed toward ground level, at or near which there are disposed a plurality of heliostats 18 or similar reflectors arrayed about the base of the tower. As is well understood, the direct radiation generally along paths 19 is reflected along paths 20 to the porous surface of the central receiver. The conduit of tower 14 is connected, for example, to a pebble bed storage vessel 21 or other heat exchanger. Vessel 21 is connected by conduit 22 to a fan or blower 23 by means of which atmospheric air surrounding the central receiver is drawn through the porous wall into chamber 16 and through the tower to the storage vessel or other heat exchanger.

Figure 4:
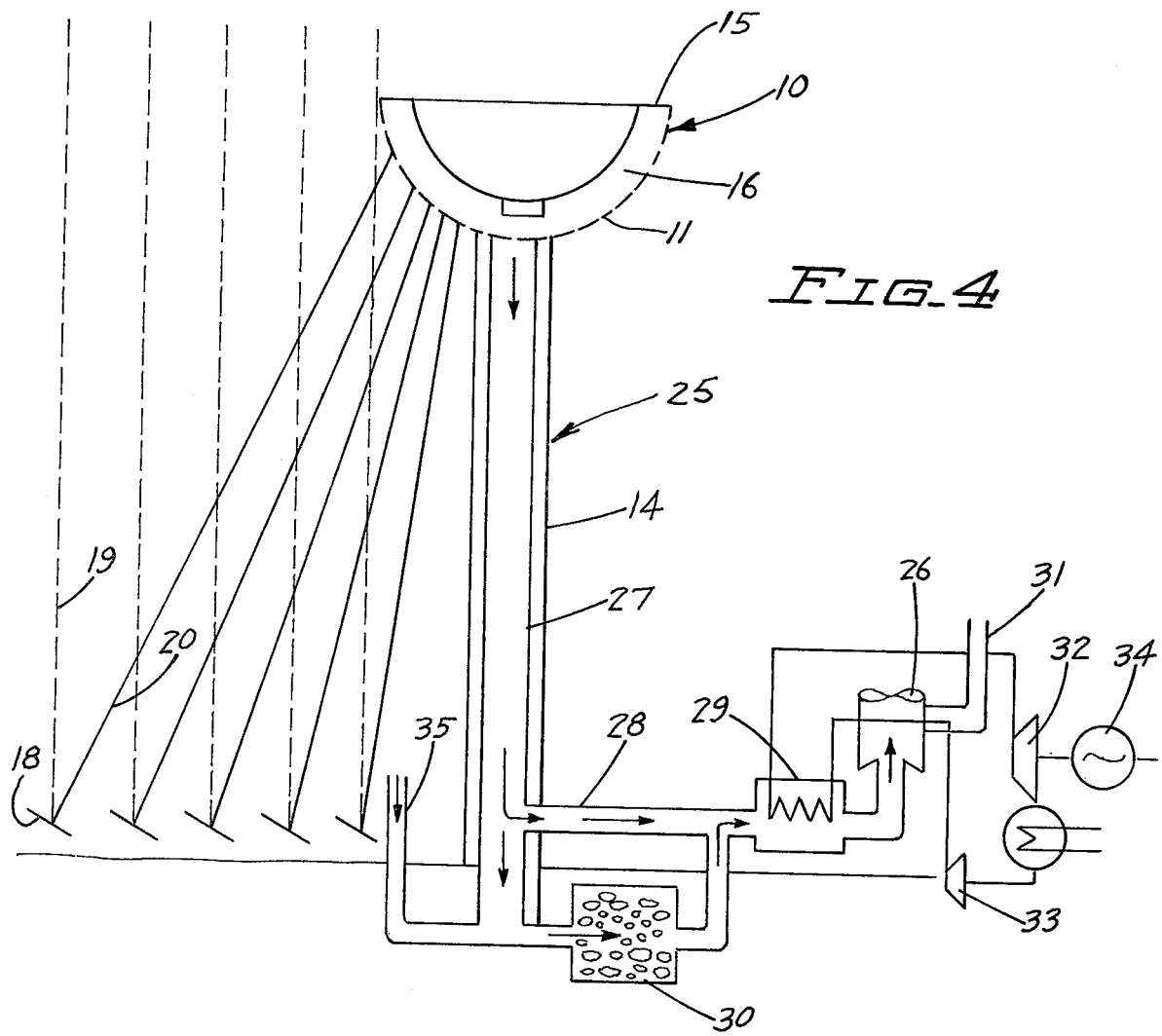
FIG. 4 is a schematic representation of a further form of solar power tower system.

Referring now to FIG. 4, there is shown in schematic form another system in which the porous surface receiver may be utilized. The central receiver is supported by a tower structure 25 above the ground. Air is drawn by means of fan or blower 26 through the porous wall 11 into chamber 16. The heated air is drawn through duct 27 either directly through ducts 28 into a heat exchanger 29 or to storage chamber 30. The flow path of the heated air is determined by appropriate valving which, while not shown, is somewhat arbitrary and being specified according to well-known engineering principles, can readily be planned by any engineer competent in the field. The spent air may be exhausted to the atmosphere at 31. As an example of the utilization of the heat, steam generated in exchanger 29 may be passed to turbine 32 with the condensate returned through pump 33. Electricity is produced by generator 34 driven by the turbine. During periods of no sunshine, the stored heat from chamber 30 is utilized in the heat exchange, outside air being drawn in through inlet 35 through the heat storage chamber.

In the exemplary systems, all illustrated and described, air from the surrounding atmosphere is drawn through the porous walls of the receiver and heated as it passes through. Some of the concentrated solar radiation is absorbed on the outer surface of the wall and some on the surface within the pores. Heat is conducted through the wall. The air passing through the porous wall is heated efficiently by the large contact surface within the pores as well as on the outer and inner surfaces of the wall. Instead of the illustrated bowl design, the receiver may be formed from a plurality of porous wall tubes. Instead of being in the open as illustrated, the large curved surface of the receiver may be housed within a cavity with the radiation entering the opening of the cavity before striking the porous convex surface. Many alternative variations of the system are possible. For example, the heat exchanger, or even an entire heat engine, may be mounted on the tower. The air drawn through the porous wall receiver is then discharged at the top of the tower. A different working fluid may then transport the energy to a heat engine or other device.

Heat transfer parameters for exemplary cylindrical hole porous surface solar collectors are shown in the table:

| HEAT TRANSFER PARAMETERS FOR CYLINDRICAL HOLE POROUS SURFACE SOLAR COLLECTORS | | | | | | |
|---|---|---|---|---|---|---|
| No. | $T_w$ | $T_c$ | $C_Q$ | p | G | D |
| 1 | 1500. | 1498. | .147E+03 | .50 | 5. | .50000 |
| 2 | 1000. | 998. | .130E+03 | .50 | 5. | .50000 |
| 3 | 500. | 497. | .911E+02 | .50 | 5. | .50000 |
| 4 | 500. | 314. | .609E+03 | .50 | 5. | .50000 |
| 5 | 500. | 227. | .888E+03 | .50 | 5. | .50000 |
| 6 | 1500. | 1499. | .735E+02 | .25 | 5. | .50000 |
| 7 | 1500. | 1434. | .717E+03 | .25 | 5. | .50000 |
| 8 | 1000. | 999. | .648E+02 | .25 | 5. | .50000 |
| 9 | 1000. | 876. | .588E+03 | .25 | 5. | .50000 |
| 10 | 1000. | 687. | .966E+03 | .25 | 5. | .50000 |
| 11 | 500. | 499. | .456E+02 | .25 | 5. | .50000 |
| 12 | 500. | 361. | .341E+03 | .25 | 5. | .50000 |
| 13 | 500. | 278. | .531E+03 | .25 | 5. | .50000 |
| 14 | 1500. | 1496. | .206E+03 | .70 | 5. | .50000 |
| 15 | 1000. | 994. | .181E+03 | .70 | 5. | .50000 |
| 16 | 500. | 492. | .127E+03 | .70 | 5. | .50000 |
| 17 | 500. | 256. | .713E+03 | .70 | 5. | .50000 |
| 18 | 500. | 175. | .969E+03 | .70 | 5. | .50000 |
| 19 | 1500. | 1498. | .147E+03 | .50 | 20. | .50000 |
| 20 | 1000. | 998. | .130E+03 | .50 | 20. | .50000 |
| 21 | 500. | 497. | .911E+02 | .50 | 20. | .50000 |
| 22 | 500. | 317. | .631E+03 | .50 | 20. | .50000 |
| 23 | 500. | 197. | .801E+03 | .50 | 20. | .50000 |
| 24 | 1500. | 1499. | .735E+02 | .25 | 20. | .50000 |
| 25 | 1500. | 1448. | .723E+03 | .25 | 20. | .50000 |
| 26 | 1000. | 999. | .648E+02 | .25 | 20. | .50000 |
| 27 | 1000. | 927. | .618E+03 | .25 | 20. | .50000 |
| 28 | 500. | 499. | .456E+02 | .25 | 20. | .50000 |

HEAT TRANSFER PARAMETERS FOR CYLINDRICAL HOLE POROUS SURFACE SOLAR COLLECTORS -continued

| No. | $T_w$ | $T_e$ | $C_Q$ | p | G | D |
|---|---|---|---|---|---|---|
| 29 | 500. | 411. | .392E+03 | .25 | 20. | .50000 |
| 30 | 500. | 291. | .580E+03 | .25 | 20. | .50000 |
| 31 | 1500. | 1496. | .206E+03 | .70 | 20. | .50000 |
| 32 | 1000. | 994. | .181E+03 | .70 | 20. | .50000 |
| 33 | 500. | 492. | .127E+03 | .70 | 20. | .50000 |
| 34 | 500. | 236. | .674E+03 | .70 | 20. | .50000 |
| 35 | 500. | 142. | .794E+03 | .70 | 20. | .50000 |
| 36 | 1500. | 1498. | .147E+03 | .50 | 100. | .50000 |
| 37 | 1000. | 998. | .130E+03 | .50 | 100. | .50000 |
| 38 | 500. | 497. | .911E+02 | .50 | 100. | .50000 |
| 39 | 500. | 317. | .631E+03 | .50 | 100. | .50000 |
| 40 | 500. | 194. | .793E+03 | .50 | 100. | .50000 |
| 41 | 1500. | 1499. | .735E+02 | .25 | 100. | .50000 |
| 42 | 1500. | 1448. | .723E+03 | .25 | 100. | .50000 |
| 43 | 1000. | 999. | .648E+02 | .25 | 100. | .50000 |
| 44 | 1000. | 927. | .618E+03 | .25 | 100. | .50000 |
| 45 | 500. | 499. | .456E+02 | .25 | 100. | .50000 |
| 46 | 500. | 412. | .393E+03 | .25 | 100. | .50000 |
| 47 | 500. | 291. | .585E+03 | .25 | 100. | .50000 |
| 48 | 1500. | 1496. | .206E+03 | .70 | 100. | .50000 |
| 49 | 1000. | 994. | .181E+03 | .70 | 100. | .50000 |
| 50 | 500. | 492. | .127E+03 | .70 | 100. | .50000 |
| 51 | 500. | 236. | .674E+03 | .70 | 100. | .50000 |
| 52 | 500. | 139. | .772E+03 | .70 | 100. | .50000 |
| 53 | 1500. | 1500. | .147E+03 | .50 | 5. | .10000 |
| 54 | 1000. | 1000. | .130E+03 | .50 | 5. | .10000 |
| 55 | 500. | 500. | .915E+02 | .50 | 5. | .10000 |
| 56 | 500. | 486. | .896E+03 | .50 | 5. | .10000 |
| 57 | 1500. | 1500. | .735E+02 | .25 | 5. | .10000 |
| 58 | 1500. | 1498. | .735E+03 | .25 | 5. | .10000 |
| 59 | 1000. | 1000. | .648E+02 | .25 | 5. | .10000 |
| 60 | 1000. | 997. | .647E+03 | .25 | 5. | .10000 |
| 61 | 500. | 500. | .457E+02 | .25 | 5. | .10000 |
| 62 | 500. | 495. | .454E+03 | .25 | 5. | .10000 |
| 63 | 500. | 467. | .864E+03 | .25 | 5. | .10000 |
| 64 | 1500. | 1500. | .206E+03 | .70 | 5. | .10000 |
| 65 | 1000. | 1000. | .182E+03 | .70 | 5. | .10000 |
| 66 | 500. | 500. | .128E+03 | .70 | 5. | .10000 |
| 67 | 1500. | 1500. | .147E+03 | .50 | 20. | .10000 |
| 68 | 1000. | 1000. | .130E+03 | .50 | 20. | .10000 |
| 69 | 500. | 500. | .915E+02 | .50 | 20. | .10000 |
| 70 | 500. | 487. | .897E+03 | .50 | 20. | .10000 |
| 71 | 1500. | 1500. | .735E+02 | .25 | 20. | .10000 |
| 72 | 1500. | 1498. | .735E+03 | .25 | 20. | .10000 |
| 73 | 1000. | 1000. | .648E+02 | .25 | 20. | .10000 |
| 74 | 1000. | 997. | .647E+03 | .25 | 20. | .10000 |
| 75 | 500. | 500. | .457E+02 | .25 | 20. | .10000 |
| 76 | 500. | 495. | .454E+03 | .25 | 20. | .10000 |
| 77 | 500. | 482. | .890E+03 | .25 | 20. | .10000 |
| 78 | 1500. | 1500. | .206E+03 | .70 | 20. | .10000 |
| 79 | 1000. | 1000. | .182E+03 | .70 | 20. | .10000 |
| 80 | 500. | 500. | .128E+03 | .70 | 20. | .10000 |
| 81 | 1500. | 1500. | .147E+03 | .50 | 100. | .10000 |
| 82 | 1000. | 1000. | .130E+03 | .50 | 100. | .10000 |
| 83 | 500. | 500. | .915E+02 | .50 | 100. | .10000 |
| 84 | 500. | 487. | .897E+03 | .50 | 100. | .10000 |
| 85 | 1500. | 1500. | .735E+02 | .25 | 100. | .10000 |
| 86 | 1500. | 1498. | .735E+03 | .25 | 100. | .10000 |
| 87 | 1000. | 1000. | .648E+02 | .25 | 100. | .10000 |
| 88 | 1000. | 997. | .647E+03 | .25 | 100. | .10000 |
| 89 | 500. | 500. | .457E+02 | .25 | 100. | .10000 |
| 90 | 500. | 495. | .454E+03 | .25 | 100. | .10000 |
| 91 | 500. | 482. | .890E+03 | .25 | 100. | .10000 |
| 92 | 1500. | 1500. | .206E+03 | .70 | 100. | .10000 |
| 93 | 1000. | 1000. | .182E+03 | .70 | 100. | .10000 |
| 94 | 500. | 500. | .128E+03 | .70 | 100. | .10000 |
| 95 | 1500. | 1500. | .147E+03 | .50 | 5. | .05000 |
| 96 | 1000. | 1000. | .130E+03 | .50 | 5. | .05000 |
| 97 | 500. | 500. | .915E+02 | .50 | 5. | .05000 |
| 98 | 500. | 497. | .911E+03 | .50 | 5. | .05000 |
| 99 | 1500. | 1500. | .735E+02 | .25 | 5. | .05000 |
| 100 | 1500. | 1499. | .735E+03 | .25 | 5. | .05000 |
| 101 | 1000. | 1000. | .648E+02 | .25 | 5. | .05000 |
| 102 | 1000. | 999. | .648E+03 | .25 | 5. | .05000 |
| 103 | 500. | 500. | .457E+02 | .25 | 5. | .05000 |
| 104 | 500. | 499. | .456E+03 | .25 | 5. | .05000 |
| 105 | 500. | 495. | .907E+03 | .25 | 5. | .05000 |
| 106 | 1500. | 1500. | .206E+03 | .70 | 5. | .05000 |
| 107 | 1000. | 1000. | .182E+03 | .70 | 5. | .05000 |
| 108 | 500. | 500. | .128E+03 | .70 | 5. | .05000 |
| 109 | 1500. | 1500. | .147E+03 | .50 | 20. | .05000 |
| 110 | 1000. | 1000. | .130E+03 | .50 | 20. | .05000 |
| 111 | 500. | 500. | .915E+02 | .50 | 20. | .05000 |
| 112 | 500. | 497. | .911E+03 | .50 | 20. | .05000 |
| 113 | 1500. | 1500. | .735E+02 | .25 | 20. | .05000 |
| 114 | 1500. | 1499. | .735E+03 | .25 | 20. | .05000 |
| 115 | 1000. | 1000. | .648E+02 | .25 | 20. | .05000 |
| 116 | 1000. | 999. | .648E+03 | .25 | 20. | .05000 |
| 117 | 500. | 500. | .457E+02 | .25 | 20. | .05000 |
| 118 | 500. | 499. | .456E+03 | .25 | 20. | .05000 |
| 119 | 500. | 495. | .908E+03 | .25 | 20. | .05000 |
| 120 | 1500. | 1500. | .206E+03 | .70 | 20. | .05000 |
| 121 | 1000. | 1000. | .182E+03 | .70 | 20. | .05000 |
| 122 | 500. | 500. | .128E+03 | .70 | 20. | .05000 |
| 123 | 1500. | 1500. | .147E+03 | .50 | 100. | .05000 |
| 124 | 1000. | 1000. | .130E+03 | .50 | 100. | .05000 |
| 125 | 500. | 500. | .915E+02 | .50 | 100. | .05000 |
| 126 | 500. | 497. | .911E+03 | .50 | 100. | .05000 |
| 127 | 1500. | 1500. | .735E+02 | .25 | 100. | .05000 |
| 128 | 1500. | 1499. | .735E+03 | .25 | 100. | .05000 |
| 129 | 1000. | 1000. | .648E+02 | .25 | 100. | .05000 |
| 130 | 1000. | 999. | .648E+03 | .25 | 100. | .05000 |
| 131 | 500. | 500. | .457E+02 | .25 | 100. | .05000 |
| 132 | 500. | 499. | .456E+03 | .25 | 100. | .05000 |
| 133 | 500. | 495. | .908E+03 | .25 | 100. | .05000 |
| 134 | 1500. | 1500. | .206E+03 | .70 | 100. | .05000 |
| 135 | 1000. | 1000. | .182E+03 | .70 | 100. | .05000 |
| 136 | 500. | 500. | .128E+03 | .70 | 100. | .05000 |

Wall Conductivity = 14.0 W/m °C.
$T_w$ = Upstream wall temperature in °C.
$T_e$—Gas exit temperature in °C.
$C_Q$ = Apparent heat flux/1400 1400 in $W/m^2/W/m^2$
P = Porosity in %
G = Thickness of porous wall/D
D = Diameter of holes in mm It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A solar energy receiver system comprising:
(A) a porous surface concentrating receiver or reflected solar radiation comprising:
(1) a housing enclosing an air chamber, said housing being disposed elevated atop a tower in open air,
(2) a porous air permeable wall composed of high temperature heat absorptive material comprising at least one wall of said housing, said wall being directed downwardly,
(a) said air permeable wall being exposed to the atmosphere,
(b) said porous wall thickness being between about 1 mm and 2 cm,
(c) said porous wall having openings over about 10 to 90 percent of its surface,
(d) the pore dimensions of said opening ranging between about 0.05 mm to 5 mm effective hydraulic diameter, and
(e) said porous wall being composed of a substance selected from the group consisting of metallic alloys and refractory non-metallic material capable of withstanding temperatures in the range of about 500° to at least about 1500° C., (B) a plurality of concentrating reflectors disposed at a lower level relative to said housing arrayed around the base of the tower to reflect and concentrate sunlight upon said porous wall to produce high radiation fluxes at the wall surface, (C) heat exchanger means by which heat from heated atmospheric air is transferred to another medium, (D) air flow conduit means connecting said housing and heat exchanger means, and (E) means for drawing atmospheric air through said porous wall into said chamber to heat the air, and for withdrawing said heated air from the chamber through the conduit means to the heat exchanger.

2. A system according to claim 1 further characterized in that the pores of said wall are cylindrical holes.

3. A system according to claim 1 further characterized in that:
(A) said reflectors and heliostats, and
(B) said porous wall is generally convexly curved, and the outer convex surface of the wall is directed downwardly toward said heliostats.

4. A system according to claim 1 further characterized in that said heat exchanger means includes a heat storage bed.

5. A system according to claim 1 further characterized in that said heat exchanger means includes an air-fluid heat exchanger in communication with said chamber and with a heat storage bed.

6. A solar receiver system according to claim 1 further characterized in that said porous wall is generally curved, and the outer convex surface of the wall is directed downwardly toward said reflectors.

* * * * *

UNITED STATES PATENT AND TRADEMARK OFFICE
CERTIFICATE OF CORRECTION

PATENT NO. : 4,318,393
DATED : March 9, 1982
INVENTOR(S) : Richard J. Goldstein

It is certified that error appears in the above-identified patent and that said Letters Patent are hereby corrected as shown below:

Column 1, line 29, "concentation" should be --concentration--.

Column 4, line 2, "ducts 28" should be --duct 28--.

Column 4, line 17, "all" should be --as--.

Column 6, line 33, "1400" (2nd occurrence) should be omitted.

Column 6, line 46, "or" should be --of--.

Column 8, line 3, "and" (1st occurrence) should be --are--.

Signed and Sealed this

First Day of February 1983

[SEAL]

Attest:

GERALD J. MOSSINGHOFF

Attesting Officer

Commissioner of Patents and Trademarks